(12) United States Patent
Peng et al.

(10) Patent No.: US 11,598,315 B2
(45) Date of Patent: Mar. 7, 2023

(54) TRIBOELECTRIC NANOGENERATION MODULE, AND COMBINED WIND TURBINE AND METHOD THEREOF

(71) Applicant: Shanghai University, Shanghai (CN)

(72) Inventors: Yan Peng, Shanghai (CN); Chuanfu Xin, Shanghai (CN); Zhongjie Li, Shanghai (CN); Jun Luo, Shanghai (CN); Shaorong Xie, Shanghai (CN); Huayan Pu, Shanghai (CN)

(73) Assignee: Shanghai University, Shanghai (CN)

( * ) Notice: Subject to any disclaimer, the term of this patent is extended or adjusted under 35 U.S.C. 154(b) by 175 days.

(21) Appl. No.: 17/324,340

(22) Filed: May 19, 2021

(65) Prior Publication Data

US 2022/0205427 A1    Jun. 30, 2022

(30) Foreign Application Priority Data

Dec. 28, 2020 (CN) .......................... 202011577910.8

(51) Int. Cl.
*F03D 9/25* (2016.01)
*F03D 15/00* (2016.01)
(Continued)

(52) U.S. Cl.
CPC ............... *F03D 9/25* (2016.05); *F03D 15/00* (2016.05); *H02K 7/183* (2013.01); *H02N 1/04* (2013.01);
(Continued)

(58) Field of Classification Search
CPC ............ F03D 9/25; F03D 15/00; F03D 80/00; H02K 7/183; H02K 7/1838; H02N 1/04;
(Continued)

(56) References Cited

U.S. PATENT DOCUMENTS 11,309,808 B1 * 4/2022 Li ........................... H02K 35/02
2017/0117824 A1 * 4/2017 Jiang ...................... H02N 2/183
(Continued)

OTHER PUBLICATIONS

CN 111525830; Friction Generator; Cheng et al. (Year: 2021).*
(Continued)

*Primary Examiner* — Ahmed Elnakib
(74) *Attorney, Agent, or Firm* — The Dobrusin Law Firm, P.C.

(57) ABSTRACT

A triboelectric nanogeneration module, and a combined wind turbine and a method thereof. The triboelectric nanogeneration module includes a rotating disc, and moving friction plates and fixed friction plates that are oppositely arranged outside the radial direction of the rotating disc. A nano-friction material layer is arranged on the surface of each of the moving friction plates and the fixed friction plates. Driving devices are arranged on the rotating disc in the circumferential direction at intervals. The driving devices are used for extruding the moving friction plates to move to the positions at which the moving friction plates are in contact with the fixed friction plates. The moving friction plates are connected to reset devices used for separating the moving friction plates from the fixed friction plates. The moving friction plates perform straight reciprocating movement under the action of the driving devices and the reset devices.

20 Claims, 6 Drawing Sheets

(51) Int. Cl.
*H02K 7/18* (2006.01)
*H02N 1/04* (2006.01)

(52) U.S. Cl.
CPC ..... *F05B 2220/706* (2013.01); *F05B 2240/60* (2013.01)

(58) Field of Classification Search
CPC . F05B 2220/706; F05B 2240/60; Y02E 10/72
USPC ........................................................ 310/310
See application file for complete search history.

(56) References Cited

U.S. PATENT DOCUMENTS

| 2021/0226557 A1* | 7/2021 | Chen | .................. H02N 1/04 |
| 2022/0038031 A1* | 2/2022 | Gooneratne | ............ E21B 47/01 |
| 2022/0175079 A1* | 6/2022 | Li | .................. H02N 2/183 |

OTHER PUBLICATIONS

CN-111446883-B; Friction nano electric generator for collecting wind energy (Year: 2022).*
CN-111525829-B; Friction generator (Year: 2021).*
WO 2014/169665; Friction nano power generator, has conductive unit (Year: 2014).*

* cited by examiner

TRIBOELECTRIC NANOGENERATION MODULE, AND COMBINED WIND TURBINE AND METHOD THEREOF

TECHNICAL FIELD

The present disclosure relates to the field of green energy resources, and in particular to a triboelectric nanogeneration module, and a combined wind turbine and a method thereof.

BACKGROUND

At present, the Internet of things technology has become very common in life. Various objects and users are connected by the Internet of things technology by using sound, light, electricity, and the like. The Internet of things technology enhances the ubiquitous connection between objects and people, and makes it possible for objects to perceive, identify, and manage processes through network access, so as to transform these daily processes into components of an "intelligent" network. During the popularization of the Internet of things, it will be a huge challenge to power hundreds of millions of sensors. At present, the sensors are mainly powered by batteries. However, the batteries will no longer be applicable due to the disadvantages of short service lives and environmental pollution of the conventional batteries. In order to solve these problems, researchers are actively developing environment friendly energy resources, such as wind, solar energy, mechanical vibration, water, and the like. Particularly wind energy, due to the advantage of rich natural resources, wind is considered as one of the important energy sources.

In order to power hundreds of millions of sensors, each individual energy collecting device must be low in cost, have effective power output, and have a small size for micro applications. Conventional wind turbines are either expensive, cumbersome, and low in efficiency, or not suitable for these micro applications, while Triboelectric Nanogenerators (TENG) with the characteristics of simple manufacturing, low cost, and the like has attracted extensive attention, so the researchers have carried out deep research on the triboelectric nanogenerators. For example, the invention patent application with the application number of 201910222467.3 discloses a rotary electromagnetic-friction composite nanogenerator. A triboelectric nanogeneration assembly includes an electrode array and a flexible blade array, where the flexible blade array is arranged on an outer wall of an inner cylinder and forms friction with a electrode array arranged on an outer cylinder through the rotation of the inner cylinder. However, in the above structure, great resistance will be produced to the rotation of the inner cylinder in a triboelectric generation process due to a large contact area between the electrode array and the flexible blade array, so the utilization rate of the wind energy is low.

SUMMARY

The objective of the present disclosure is to provide a triboelectric nanogeneration module, and a combined wind turbine and a method thereof to solve the above problems in the prior art. Moving friction plates and fixed friction plates are arranged outside the radial direction of a rotating disc, driving devices used for extruding the moving friction plates to move to the fixed friction plates are arranged on the rotating disc in the circumferential direction at intervals, and the moving friction plates are connected to reset devices, so that the moving friction plates perform straight reciprocating movement under the action of the driving devices and the reset devices, the rotating disc is subjected to resistance only when the driving devices extrude the moving friction plates, and the rotating disc will not be subjected to the action of the resistance before the moving friction plates are reset until being extruded again, which reduces the resistance at a power input end through the above structural form, thereby making the utilization rate of wind energy higher.

To achieve the above objective, the present disclosure provides the following solution: the present disclosure provides a triboelectric nanogeneration module, including a rotating disc, and moving friction plates and fixed friction plates that are oppositely arranged outside the radial direction of the rotating disc. A nano-friction material layer is arranged on the surface of each of the moving friction plates and the fixed friction plates. Driving devices are arranged on the rotating disc in the circumferential direction at intervals. The driving devices are used for extruding the moving friction plates to move to the positions at which the moving friction plates are in contact with the fixed friction plates. The moving friction plates are connected to reset devices used for separating the moving friction plates from the fixed friction plates. The moving friction plates perform straight reciprocating movement under the action of the driving devices and the reset devices.

Preferably, a flexible buffer layer is further arranged between the nano-friction material layer and the fixed friction plate.

Preferably, the driving devices are roller components; the roller component includes a roller bracket and a rotating roller rotatably arranged on the roller bracket.

Another objective of the present disclosure is to provide a combined wind turbine, including an energy capture module, the triboelectric nanogeneration module, and an electromagnetic power generation module. The energy capture module includes a transmission shaft. The rotating disc is fixedly connected to the transmission shaft. The electromagnetic power generation module includes a rotor and a stator. The rotor includes the rotating disc and magnets that are arranged on a disc surface of the rotating disc and are arranged in the circumferential direction. The stator includes a fixed disc arranged opposite to the rotating disc, and coils that are arranged on a disc surface of the fixed disc and are arranged in the circumferential direction.

Preferably, N poles and S poles of the magnets are arranged alternately, and the magnets and the coils are all arranged in fan shapes.

Preferably, guide holes are formed in the fixed disc. The reset device includes a reset guide rod and a reset spring arranged on the reset guide rod in a sleeving manner. The reset guide rod penetrates through the guide hole and is fixedly connected to the moving friction plate. The reset guide rod drives the moving friction plate to move in the axial direction of the guide hole under the action of the elastic force of the reset spring.

Preferably, two groups of the fixed friction plates and the moving friction plates are oppositely arranged outside the radial direction of the rotating disc. Two groups of the reset devices are correspondingly arranged on the fixed disc. The two groups of the reset devices are arranged alternately up and down. The reset devices, connected to the same moving friction plate, on different fixed discs are also arranged alternately up and down.

Preferably, the combined wind turbine further includes a closed box body which covers the triboelectric nanogeneration module and the electromagnetic power generation module therein. The box body includes first side walls arranged in the axial direction of the transmission shaft and second side walls oppositely arranged on a circumferential side of the transmission shaft. The coils are arranged on the inner walls of the first side walls to form the stators. The nano-friction material layers are arranged on the inner walls of the second side walls to form the fixed friction plates.

Preferably, four stators are arranged, and three rotors are arranged. The stators and the rotors are arranged alternately to form six groups of the magnets and the coils that are arranged oppositely in total.

Yet another objective of the present disclosure is to provide a wind power generation method. The energy capture module captures wind energy and converts the wind energy into rotating movement of the transmission shaft. The transmission shaft drives the rotating disc to rotate. The driving devices arranged on the rotating disc in the circumferential direction extrude the moving friction plates and extrude until the moving friction plates are in contact with the fixed friction plates. The driving devices are separated from the moving friction plates along with the rotation of the rotating disc. The moving friction plates are reset and separated from the fixed friction plates under the action of the reset devices. The moving friction plates are in contact with or separated from the fixed friction plates continuously through straight reciprocating movement, so as to generate electric energy output to realize triboelectric nanogeneration. Meanwhile, when the rotating disc is rotated, the magnets move relative to the coils, and induction electric current is generated through the magnetic induction line cutting movement of the coils, so that electromagnetic power generation is realized.

Compared with the prior art, the present disclosure achieves the following technical effects:

1. The moving friction plates and the fixed friction plates are arranged outside the radial direction of the rotating disc, the driving devices used for extruding the moving friction plates to move to the fixed friction plates are arranged on the rotating disc in the circumferential direction at intervals, and the moving friction plates are connected to the reset devices, so that the moving friction plates perform straight reciprocating movement under the action of the driving devices and the reset devices, the rotating disc is subjected to resistance only when the driving devices extrude the moving friction plates, and the rotating disc will not be subjected to the action of the resistance before the moving friction plates are reset until being extruded again, which reduces the resistance at a power input end through the above structural form, thereby making the utilization rate of wind energy higher.

2. The contact surfaces of the moving friction plates and the fixed friction plates cannot fit completely due to the reasons of manufacturing accuracy, manufacturing error, and the like. In the present disclosure, hard contact between the moving friction plates and the fixed friction plates is avoided by arranging the flexible buffer layers between the nano-friction material layers and the fixed friction plates. The moving friction plates and the fixed friction plates can fit completely through the adjustment of the flexible buffer layers, so that the contact areas are larger; on the other hand, the reacting force on the rotating disc is smaller through the buffering of the flexible buffer layers, so that the resistance produced on the rotation of the rotating disc is smaller, which also makes the utilization rate of the wind energy higher.

3. Guide mechanisms are arranged for the reset devices, and the guide mechanisms include guide rods and guide holes, so that the moving friction plates can move along an accurate straight path, and the contact between the moving friction plates and the fixed friction plates cannot be skewed, thereby ensuring the contact areas, and improving the power generation efficiency.

BRIEF DESCRIPTION OF THE DRAWINGS

To describe the technical solutions in the embodiments of the present disclosure or in the prior art more clearly, the following briefly describes the accompanying drawings required for describing the embodiments. Apparently, the accompanying drawings in the following description are merely some embodiments of the present disclosure, and those of ordinary skill in the art may still derive other drawings from these accompanying drawings without creative efforts.

Figure 1:
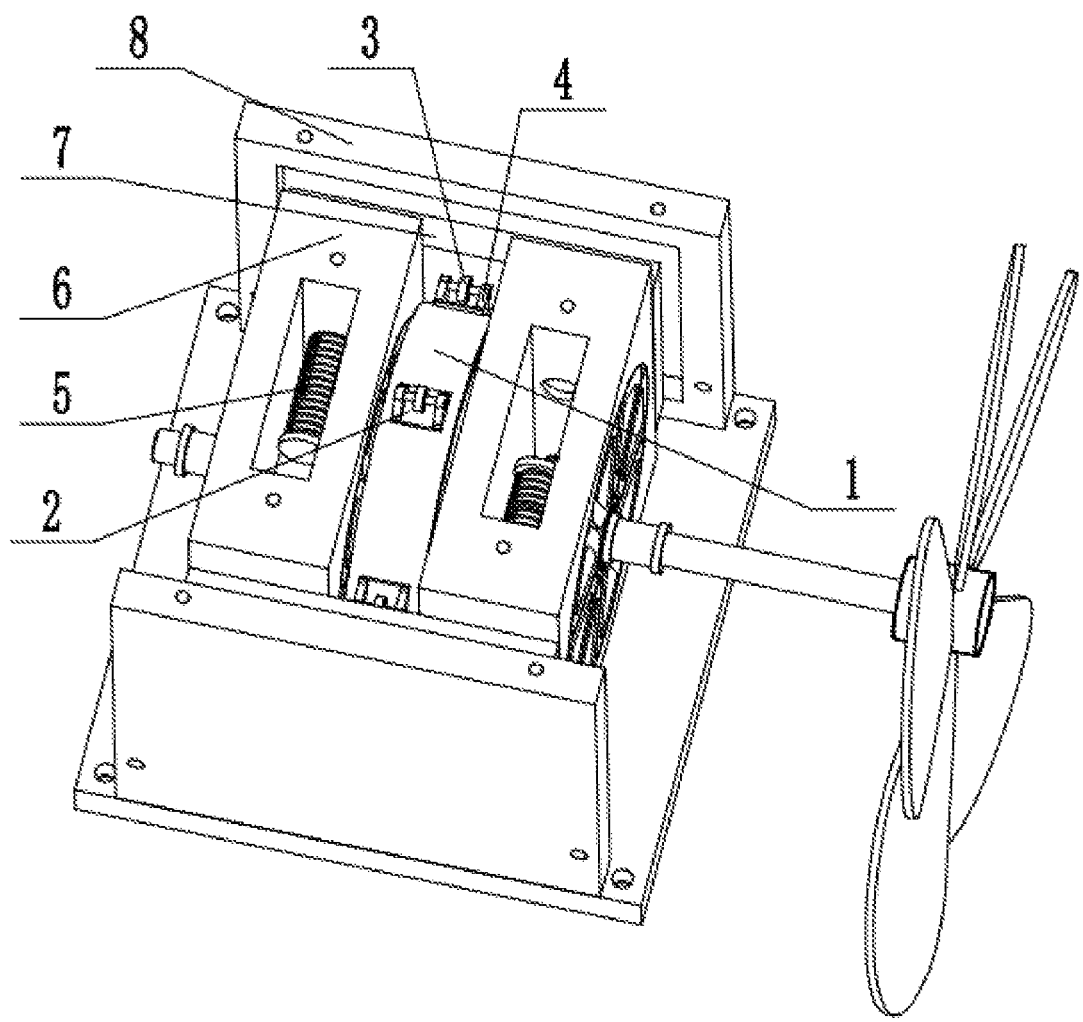
FIG. 1 is a schematic structural diagram of a triboelectric nanogeneration module.

In the drawings: 1—rotating disc; 2—driving device; 3—rotating roller; 4—roller bracket; 5—reset device; 6—fixed disc; 7—moving friction plate; 8—fixed friction plate; 9—reset guide rod; 10—reset spring; 11—guide hole; 12—sliding bearing; 13—nano-friction material layer; 14—flexible buffer layer; 15—transmission shaft; 16—fan blade; 17—magnet; 18—coil; 19—first side wall; 20—top plate; 21—bottom plate; 22—sealing bearing.

DETAILED DESCRIPTION

The technical solutions in the embodiments of the present disclosure will be clearly and completely described herein below with reference to the accompanying drawings in the embodiments of the present disclosure. Apparently, the described embodiments are merely part rather than all of the embodiments of the present disclosure. Based on the embodiments of the present disclosure, all other embodiments obtained by those of ordinary skill in the art without creative work fall within the scope of protection of the present disclosure.

The objective of the present disclosure is to provide a triboelectric nanogeneration module, and a combined wind turbine and a method thereof to solve the problems in the prior art. Moving friction plates and fixed friction plates are arranged outside the radial direction of a rotating disc, driving devices used for extruding the moving friction plates to move to the fixed friction plates are arranged on the rotating disc in the circumferential direction at intervals, and the moving friction plates are connected to reset devices, so that the moving friction plates perform straight reciprocating movement under the action of the driving devices and the reset devices, the rotating disc is subjected to resistance only when the driving devices extrude the moving friction plates, and the rotating disc will not be subjected to the action of the resistance before the moving friction plates are reset until being extruded again, which reduces the resistance at a power input end through the above structural form, thereby making the utilization rate of wind energy higher.

In order to make the above objectives, features, and advantages of the present disclosure more apparent and more comprehensible, the present disclosure is further described in detail below with reference to the accompanying drawings and specific implementation manners.

Please refer to FIG. 1 to FIG. 6.

Embodiment 1

Figure 2:
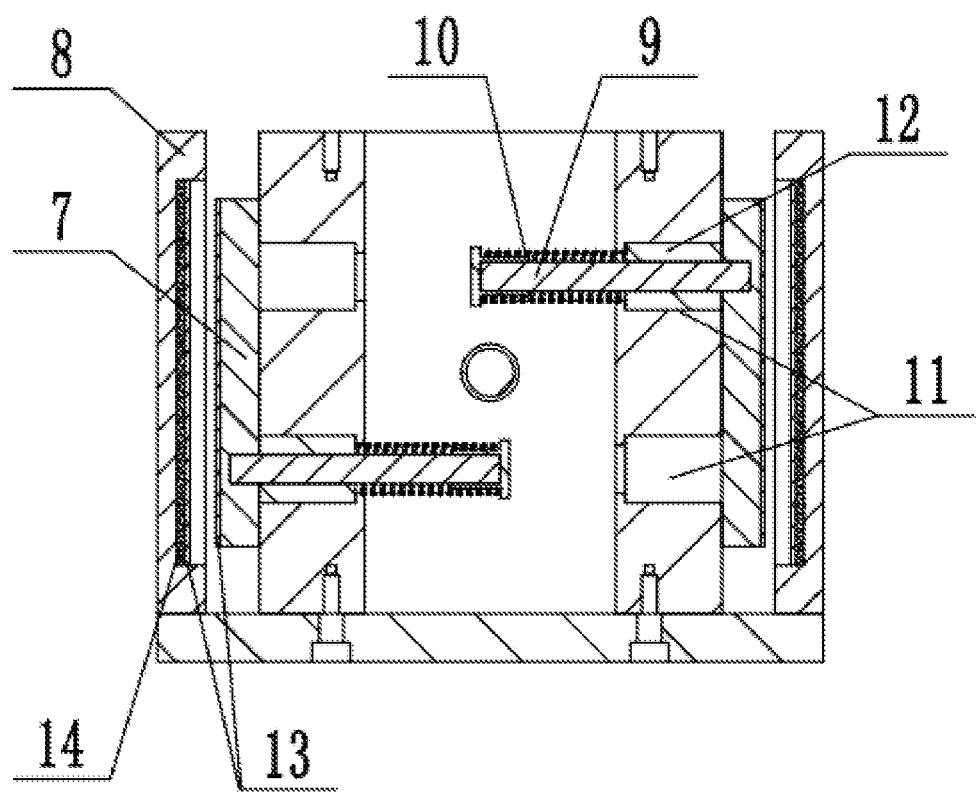
FIG. 2 is a sectional structural view of the triboelectric nanogeneration module.
Figure 3:
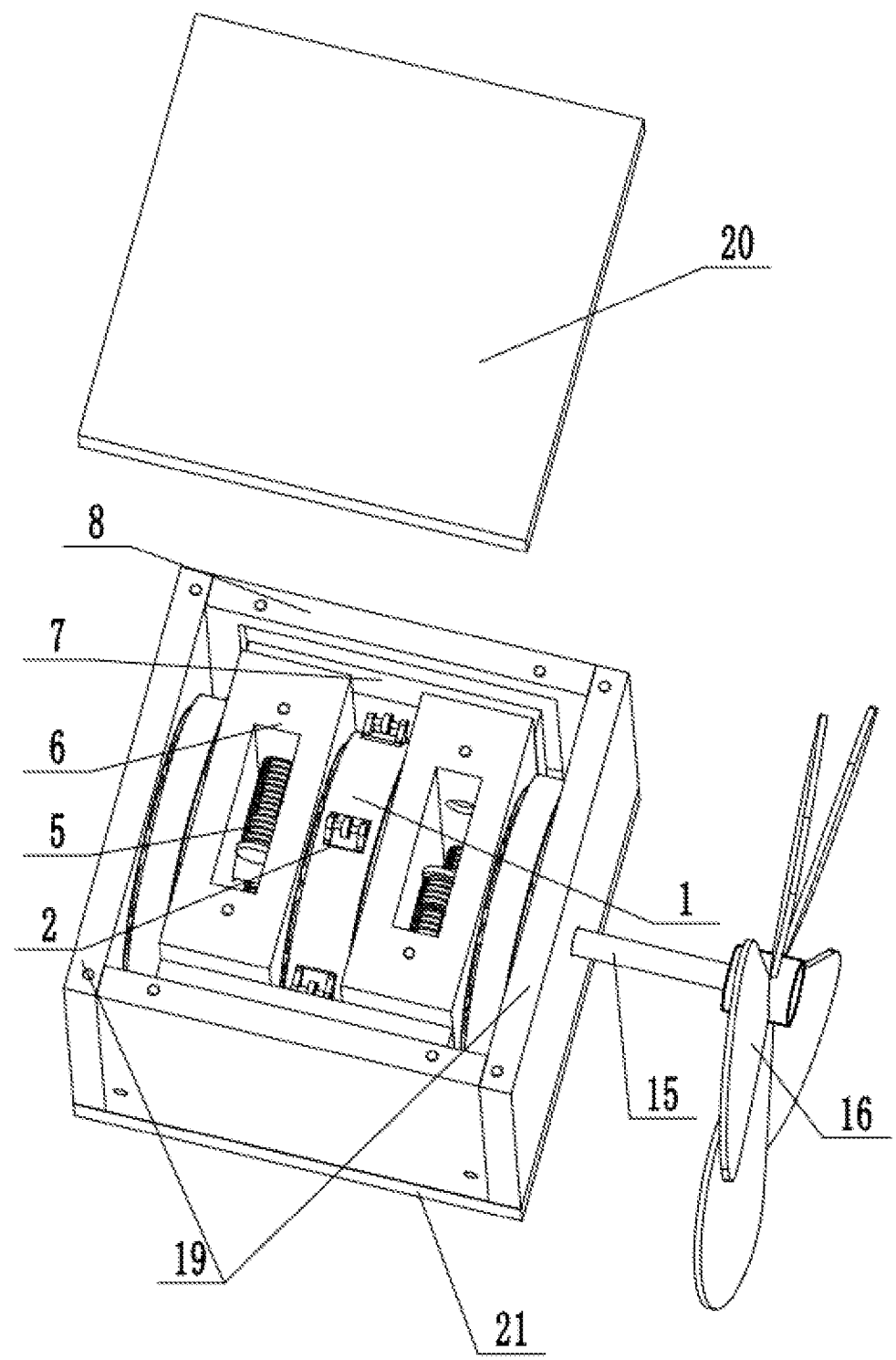
FIG. 3 is a schematic structural diagram of a wind energy collecting device.
Figure 4:
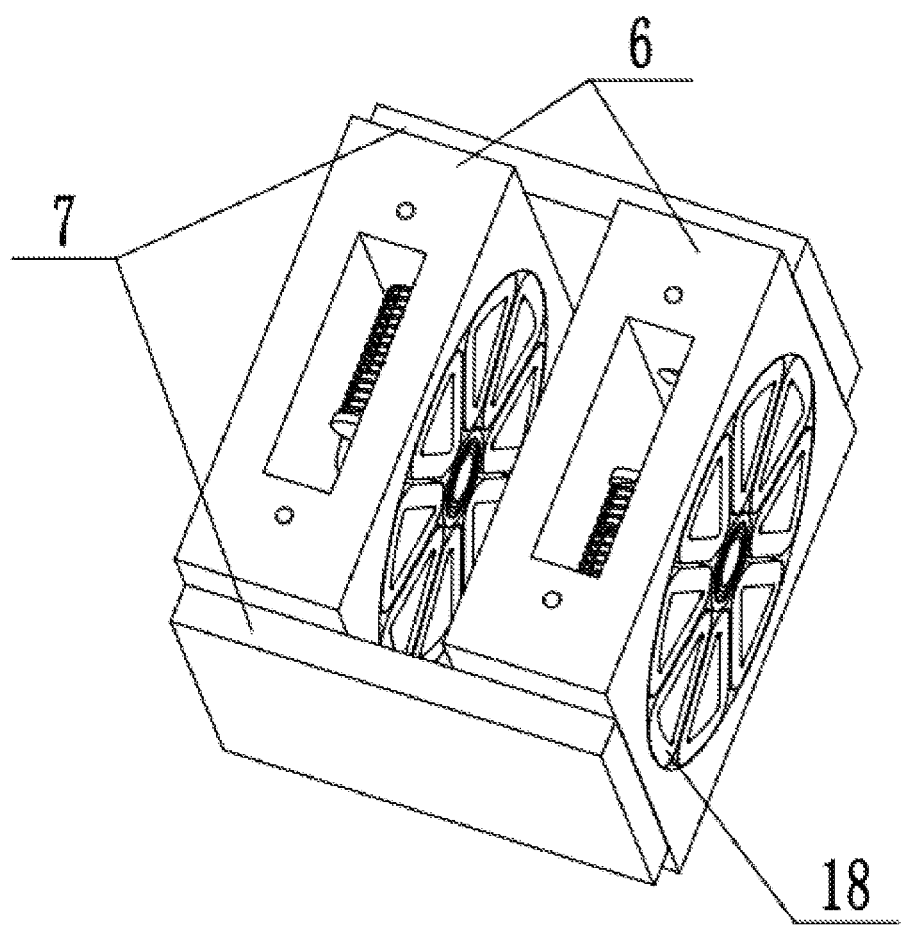
FIG. 4 is a schematic diagram of coil arrangement on a fixed disc.
Figure 5:
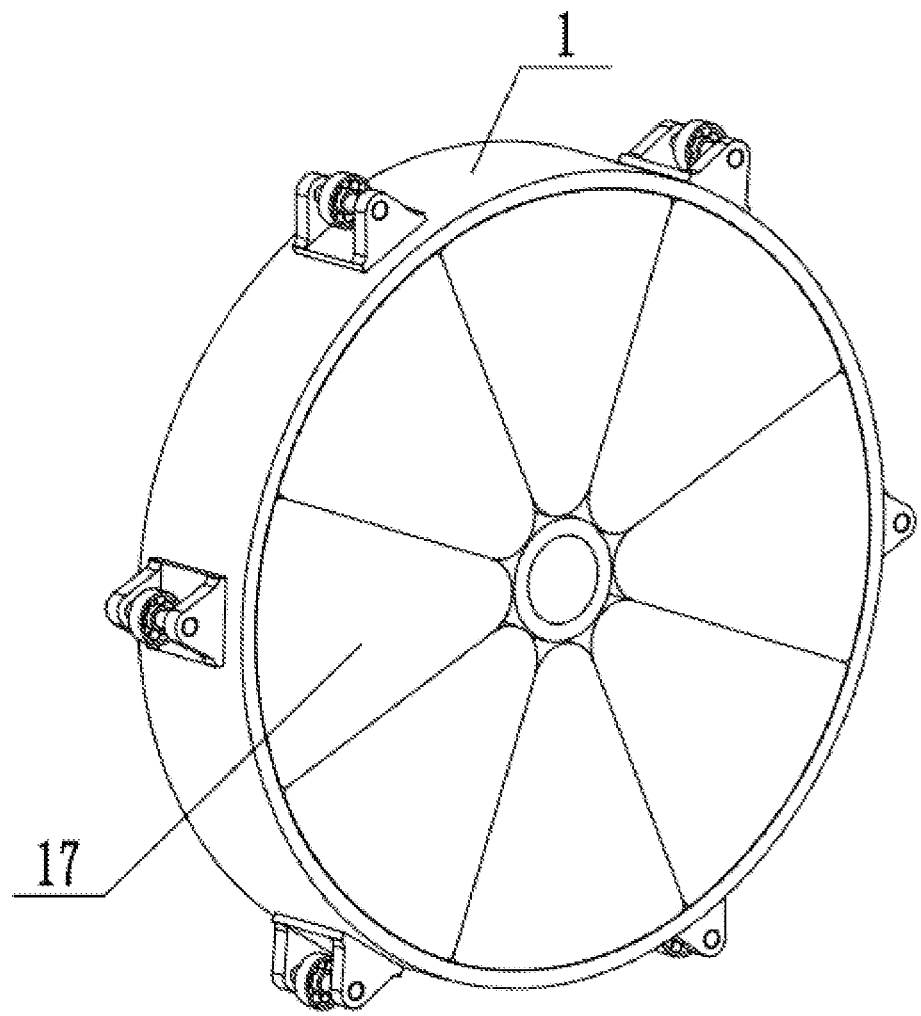
FIG. 5 is a schematic diagram of magnet arrangement on a rotating disc.
Figure 6:
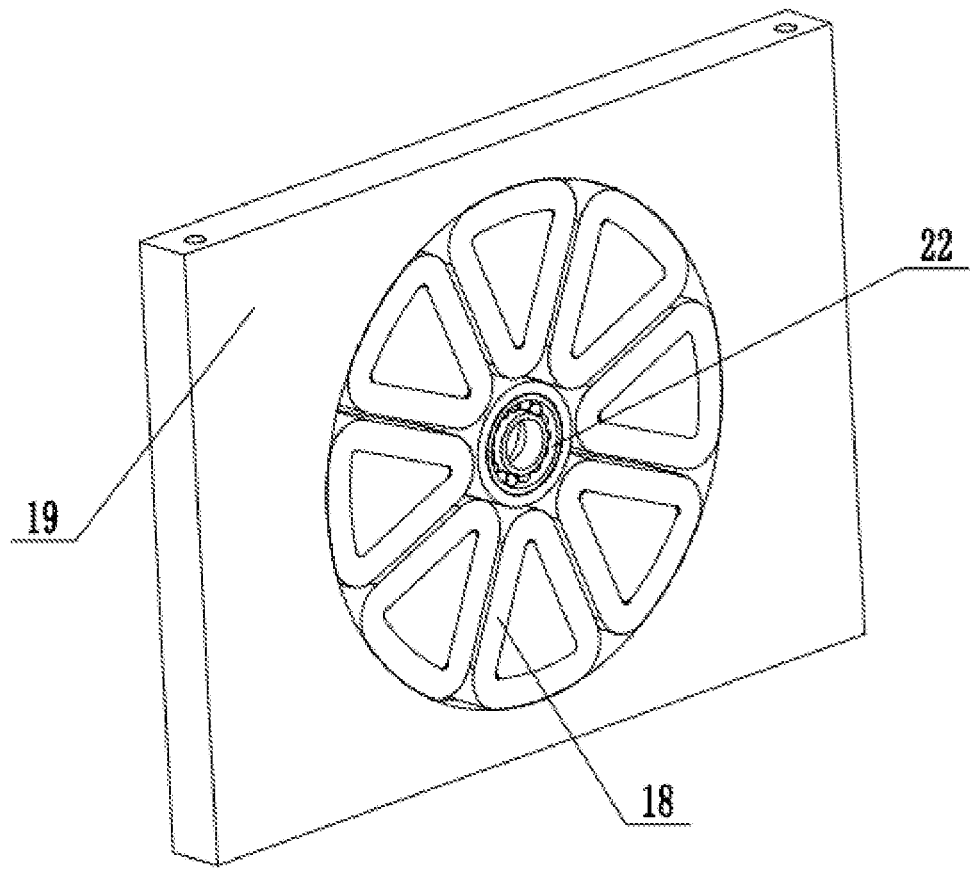
FIG. 6 is a schematic structural diagram of coil arrangement on a first side wall.

As shown in FIG. 1 to FIG. 2, the present embodiment provides a triboelectric nanogeneration module, including rotating disc 1, and moving friction plates 7 and fixed friction plates 8 that are oppositely arranged outside the radial direction of the rotating disc 1. After green energy resources, such as wind energy and water energy, are collected through an energy capture module, a transmission shaft 5 outputs rotating movement. The rotating disc 1 is driven to rotate through the transmission shaft 5. A nano-friction material layers 13 are arranged on the contact surfaces of the fixed friction plates 8 and the moving friction plates 7. Two electrodes of the nano-friction material layers 13 are respectively arranged on the fixed friction plates 8 and the moving friction plates 7. The nano-friction material layers 13 may be made of a material that is commonly used in the prior art, for example, the materials of the two electrodes are respectively a three-layer material with a copper foil, a conductive double-sided tape, and nylon arranged in sequence, and a three-layer material with a copper foil, a conductive double-sided tape, and polytetrafluoroethylene arranged in sequence, where copper foil layers fit the fixed friction plates 8 or the moving friction plates 7. The copper foil may also be replaced by aluminum and silver. The nylon may be replaced by melamine, woven wool, or the like. The polytetrafluoroethylene may be replaced by polyethylene, polypropylene, or the like. Part of the materials listed above are some preferred implementation manners, and do not form limitation to the present disclosure. Driving devices 2 which are used for extruding the moving friction plates 7 to move to the positions at which the moving friction plates 7 are in contact with the fixed friction plates 8 are arranged on the rotating disc 1 in the circumferential direction at intervals. The overall driving device 2 is of a cam like structure, and can extrude the moving friction plates 7 along with the rotation of the rotating disc 1 and make the moving friction plates 7 perform linear movement. The driving devices 2 may be fixedly arranged on an outer circumferential surface or a side surface of the rotating disc 1, as long as that the outer ends of the driving devices 2 are protruded from the outer edge of the rotating disc 1, and can extrude the moving friction plates 7 and make the moving friction plates 7 have certain linear displacement. In the present disclosure, preferably, the driving devices 2 are arranged on the outer circumferential surface of the rotating disc 1. The moving friction plates 7 are further connected to reset devices 5 used for separating the moving friction plates 7 from the fixed friction plates 8. The reset devices 5 may be arranged between the moving friction plates 7 and the fixed friction plates 8, and at this time, the reset devices 5 provide a pushing force when the moving friction plates 7 are reset; the reset devices 5 may also be arranged on the other side, namely, the side opposite to the fixed friction plates 8, of the moving friction plates 7, and at this time, the reset devices 5 provide a pulling force when the moving friction plates 7 are reset. The moving friction plates 7 perform straight reciprocating movement under the action of the driving devices 2 and the reset devices 5.

Further, a flexible buffer layer 14 is further arranged between the nano-friction material layer 13 and the fixed friction plate 8. The contact surfaces of the moving friction plate 7 and the fixed friction plate 8 cannot fit completely due to the reasons of manufacturing accuracy, manufacturing error, and the like. Hard contact between the moving friction plate 7 and the fixed friction plate 8 is avoided by arranging the flexible buffer layer 14 between the nano-friction material layer 13 and the fixed friction plate 8, where the flexible buffer layer 14 may be made of flexible materials, such as sponge, soft rubber, and silica gel. The moving friction plate 7 can fit the fixed friction plate 8 completely through adjustment of the flexible buffer layer 14, so that the contact area is larger; on the other hand, the reacting force on the rotating disc 1 is smaller through the buffering of the flexible buffer layer 14, so that the resistance produced on the rotation of the rotating disc 1 is smaller, which also makes the utilization rate of the wind energy higher.

Specifically, the driving devices 2 are roller components. The roller component includes a roller bracket 4 and a rotating roller 3 rotatably arranged on the roller bracket 4. Rolling balls are also arranged between the rotating roller 3 and a support shaft of the roller bracket 4, so that the friction between the rotating roller 3 and the moving friction plate 7 and the friction between the rotating roller 3 and the roller bracket 4 are rolling friction, thereby reducing the loss in a force transferring process and improving the work efficiency.

Embodiment 2

As shown in FIG. 1 to FIG. 6, the present embodiment provides a combined wind turbine, including an energy capture module, the triboelectric nanogeneration module in Embodiment 1, and an electromagnetic power generation module. The energy capture module includes a transmission shaft 15. After wind energy is captured by the energy capture module, the transmission shaft 15 outputs rotating movement. The rotating disc 1 is fixedly connected to the transmission shaft 15. The electromagnetic power generation module includes a rotor and a stator. The rotor includes magnets 17 that are arranged on a disc surface of the rotating disc 1 and are arranged in the circumferential direction. The stator includes a fixed disc 6 arranged opposite to the rotating disc 1, and coils 18 that are arranged on a disc surface of the fixed disc 6 and are arranged in the circumferential direction. The transmission shaft 15 drives the rotor to rotate relative to the stator, and the coils 18 perform magnetic induction line cutting movement in a magnetic field formed by the magnets 17.

To improve the power generation efficiency of electromagnetic power generation, multiple stators and rotors may be arranged alternately. When the multiple stators and rotors are arranged, the driving devices 2 can be only arranged on a middle rotating disc 1, and the driving devices 2 do not need to be arranged on the other rotating discs 1, which avoids a poor straight reciprocating movement effect of the moving friction plates 7 caused by the asynchronism of the driving devices 2 arranged on various rotating discs 1. Meanwhile, the phenomenon of increased friction caused by the contact between the driving devices 2 on other rotating discs 1 and the moving friction plates 7 is also avoided.

Further, N poles and S poles of the magnets 17 are arranged alternately, and the magnets 17 and the coils 18 are all arranged in fan shapes. When a plurality of the magnets 17 are arranged in the circumferential direction in a manner of arranging the N poles and the S poles alternately, the magnetic flux density of the coils 18 changes the most, and at this time, the maximum electric current can be generated according to the Faraday's law of electromagnetic induction. Meanwhile, when all of the magnets 17 and the coils 18 are arranged in the fan shapes, the multiple fan shapes can form a complete circle, and at this time, the utilization rate of the area is the highest.

In order to make the moving friction plates 7 perform reciprocating movement along a straight line better to make the fitting rate of the contact surfaces of the moving friction plates 7 and the fixed friction plates 8 higher, in the present embodiment, guide holes 11 are formed in the fixed disc 6. The extending direction of the guide holes 11 is consistent with the moving direction of the moving friction plates 7. Preferably, the extending direction of the guide holes 11 is perpendicular to the moving friction plates 7. The reset device 5 includes a reset guide rod 9 and a reset spring 10 arranged on the reset guide rod 9 in a sleeving manner. The reset guide rod 9 penetrates through the guide hole 11 and is fixedly connected to the moving friction plate 7. A boss is formed in the other end of the reset guide rod 9 to limit the reset spring 10 axially, and the diameter of the guide hole 11 is smaller than that of the reset spring 10. The reset spring 10 is clamped between the boss and the guide hole 11. The reset guide rod 9 drives the moving friction plate 7 to move in the axial direction of the guide hole 11 under the action of the elastic force of the reset spring 10. When the driving devices 2 extrude the moving friction plate 7 to move to be in contact with the fixed friction plate 8, the reset guide rod 9 moves to the direction of the fixed friction plate 8 along with the moving friction plate 7, while the reset spring 10 cannot penetrate through the guide hole 11 to continue moving forward and is compressed because its diameter is greater than that of the guide hole 11. When the driving devices 2 are separated from the moving friction plate 7 gradually, the reset spring 10 resets and restores to its original state to drive the reset guide rod 9 and the moving friction plate 7 to reset to original positions along the straight line, so that the moving friction plate 7 is separated from the fixed friction plate 8. Under the guide action of the guide hole 11 and the reset guide rod 9, the accuracy of the movement of the moving friction plate 7 along the straight line is higher, so that the contact between the moving friction plate 7 and the fixed friction plate 8 cannot be skewed, and then the contact area is ensured, thereby improving the power generation efficiency. Meanwhile, in the present embodiment, preferably, the reset devices 5 are arranged on the fixed discs 6 on two sides of the rotating disc 1 provided with the driving devices 2, so that the movement of the moving friction plates 7 is more stable.

In the present embodiment, two groups of the fixed friction plates 8 and the moving friction plates 7 are oppositely arranged outside the radial direction of the rotating disc 1. The two groups of the reset devices 5 are correspondingly arranged on each fixed disc 6. In order to prevent the influence produced when the two groups of the reset devices 5 move relative to each other, the two groups of the reset devices 5 are arranged alternately up and down; the reset devices 5 which are connected to the same moving friction plate 7 are also arranged alternately up and down on the two fixed discs 6 located on different sides of the rotating disc 1 provided with the driving devices 2. The reset devices 5 are arranged alternately up and down, which ensures that there are the reset devices 5 connected to the upper parts and the lower parts of the moving friction plates 7, so that the linear movement of the moving friction plates 7 is more stable.

In the present embodiment, in order to reduce the friction between the reset guide rod 9 and the guide hole 11 in continuous reciprocating movement, a sliding bearing 12 is further arranged between the reset guide rod 9 and the guide hole 11. When the sliding bearing 12 is further arranged between the reset guide rod 9 and the guide hole 11, the diameter of the guide hole 11 may be greater than that of the reset spring 10, as long as that the sliding bearing 12 can prevent the reset spring 10 from moving to the direction of the fixed friction plate 8 along with the reset guide rod 9.

Further, the combined wind turbine further includes a closed box body which covers the triboelectric nanogeneration module and the electromagnetic power generation module therein. The box body includes first side walls 19 arranged in the axial direction of the transmission shaft 15 and second side walls oppositely arranged on a circumferential side of the transmission shaft 15. Coils 18 are arranged on the inner walls of the first side walls 19. The second side walls and the moving friction plates 7 are oppositely arranged to form the fixed friction plates 8. The box body further includes a top plate 20 and a bottom plate 21. Each connecting part of the box body adopts sealed connection, which ensures the air tightness inside the box body, thereby preventing the work efficiency of the triboelectric nanogeneration module from being greatly reduced under the influence of water vapor in air. Meanwhile, the second side walls are also used as the fixed friction plates 8, and the coils 18 are mounted on the first side walls 19, which also makes use of space more fully, and the size of the overall device can be made smaller, thus the device is more applicable to micro application.

As a preferred implementation manner, in the present embodiment, four stators are arranged, and three rotors are arranged. That is, two fixed discs 6 are arranged, the coils 18 are arranged on the two disc surfaces of the two fixed discs 6, and the four stators are formed in total in combination with the coils 18 mounted on the two first side walls 19; three rotating discs 1 are arranged, and the magnets 17 are arranged on the two disc surfaces of each rotating disc 1 to form the three rotors in total. The stators and the rotors are arranged alternately to form six groups of magnets 17 and coils 18 that are arranged oppositely. The space utilization rate is improved in the form of arranging the magnets 17 on the two disc surfaces of each rotating disc 1, arranging the coils 18 on the two disc surfaces of each fixed disc 6, and arranging multiple groups of the magnets 17 and the coils 18, thereby realizing higher power generation efficiency in a limited space.

The energy capture module further includes fan blades 16 fixedly connected to the transmission shaft 15. Wind energy is collected through the fan blades 16, and then the transmission shaft 15 is driven to rotate. The fan blades 16 are arranged outside the box body. The transmission shaft 15 needs to penetrate through the first side walls 19 to penetrate out of the box body. A sealing bearing 22 is further arranged between the first side wall 19 and the transmission shaft 15, which further ensures the air tightness of an internal structure of the box body.

Embodiment 3

Based on Embodiment 1 and Embodiment 2, the present embodiment provides a wind power generation method. The energy capture module captures wind energy. In the present embodiment, the wind energy is collected through the fan blades 16. The wind blows the fan blades 16 to rotate and is converted into rotating movement of the transmission shaft 15. The transmission shaft 15 drives the rotating disc 1 to rotate. The driving devices 2 arranged on the periphery of the rotating disc 1 extrude the moving friction plates 7 and extrude the moving friction plates 7 to be in contact with the fixed friction plates 8. Then, the driving devices 2 are separated from the moving friction plates 7 along with the rotation of the rotating discs 1, the moving friction plates 7 are reset and are separated from the fixed friction plates 8 under the action of the reset devices 5. The moving friction plates 7 are in contact with or separated from the fixed friction plates 8 continuously through straight reciprocating movement, so as to generate electric energy output to realize triboelectric nanogeneration; meanwhile, when the magnets 17 arranged on the rotating discs 1 and other parts rotate along with the transmission shaft 15, the magnets 17 move relative to the coils 18, so that induction electric current is generated through the magnetic induction line cutting movement of the coils 18, thereby realizing electromagnetic power generation. The device integrates triboelectric nanogeneration and electromagnetic power generation, and realizes the collection and efficient utilization of the wind energy.

All adaptive changes made according to actual demands are within the protection scope of the disclosure.

In the present disclosure, specific examples are applied to illustrate the principle and implementation manner of the present disclosure. The description of the above embodiments is only used to help understand the method and core idea of the present disclosure. Meanwhile, for those of ordinary skill in the art, there will be changes in the specific implementation manner and scope of application according to the idea of the present disclosure. In conclusion, the content of the present description shall not be construed as a limitation to the present disclosure.

What is claimed is:

1. A triboelectric nanogeneration module, comprising a rotating disc, and moving friction plates and fixed friction plates that are oppositely arranged outside the radial direction of the rotating disc, wherein a nano-friction material layer is arranged on the surface of each of the moving friction plates and the fixed friction plates; driving devices are arranged on the rotating disc in the circumferential direction at intervals; the driving devices are used for extruding the moving friction plates to move to the positions at which the moving friction plates are in contact with the fixed friction plates; the moving friction plates are connected to reset devices used for separating the moving friction plates from the fixed friction plates; the moving friction plates perform straight reciprocating movement under the action of the driving devices and the reset devices.

2. The triboelectric nanogeneration module according to claim 1, wherein a flexible buffer layer is further arranged between the nano-friction material layer and the fixed friction plate.

3. The triboelectric nanogeneration module according to claim 2, wherein the driving devices are roller components; the roller component comprises a roller bracket and a rotating roller rotatably arranged on the roller bracket.

4. A combined wind turbine, comprising an energy capture module, the triboelectric nanogeneration module according to claim 1, and an electromagnetic power generation module, wherein the energy capture module comprises a transmission shaft; the rotating disc is fixedly connected to the transmission shaft; the electromagnetic power generation module comprises a rotor and a stator; the rotor comprises the rotating disc and magnets that are arranged on a disc surface of the rotating disc and are arranged in the circumferential direction; the stator comprises a fixed disc arranged opposite to the rotating disc, and coils that are arranged on a disc surface of the fixed disc and are arranged in the circumferential direction.

5. The combined wind turbine according to claim 4, wherein N poles and S poles of the magnets are arranged alternately, and the magnets and the coils are all arranged in fan shapes.

6. The combined wind turbine according to claim 4, wherein guide holes are formed in the fixed disc; the reset device comprises a reset guide rod and a reset spring arranged on the reset guide rod in a sleeving manner; the reset guide rod penetrates through the guide hole and is fixedly connected to the moving friction plate; the reset guide rods drive the moving friction plate to move in the axial direction of the guide hole under the action of the elastic force of the reset spring.

7. The combined wind turbine according to claim 6, wherein two groups of the fixed friction plates and the moving friction plates are oppositely arranged outside the radial direction of the rotating disc; two groups of the reset devices are correspondingly arranged on the fixed disc; the two groups of the reset devices are arranged alternately up and down; the reset devices, connected to the same moving friction plate, on different fixed discs are also arranged alternately up and down.

8. The combined wind turbine according to claim 7, further comprising a closed box body which covers the triboelectric nanogeneration module and the electromagnetic power generation module therein, wherein the box body comprises first side walls arranged in the axial direction of the transmission shaft and second side walls oppositely arranged on a circumferential side of the transmission shaft; the coils are arranged on the inner walls of the first side walls to form the stators; the nano-friction material layers are arranged on the inner walls of the second side walls to form the fixed friction plates.

9. The combined wind turbine according to claim 4, further comprising a closed box body which covers the triboelectric nanogeneration module and the electromagnetic power generation module therein, wherein the box body comprises first side walls arranged in the axial direction of the transmission shaft and second side walls oppositely arranged on a circumferential side of the transmission shaft; the coils are arranged on the inner walls of the first side walls to form the stators; the nano-friction material layers are arranged on the inner walls of the second side walls to form the fixed friction plates.

10. The combined wind turbine according to claim 9, wherein four stators are arranged, and three rotors are arranged; the stators and the rotors are arranged alternately to form six groups of the magnets and the coils that are arranged oppositely in total.

11. A wind power generation method applying the combined wind turbine according to claim 4, wherein the energy capture module captures wind energy and converts the wind energy into rotating movement of the transmission shaft; the transmission shaft drives the rotating disc to rotate; the driving devices arranged on the rotating disc in the circumferential direction extrude the moving friction plates and extrude until the moving friction plates are in contact with the fixed friction plates; the driving devices are separated from the moving friction plates along with the rotation of the rotating disc; the moving friction plates are reset and separated from the fixed friction plates under the action of the reset devices; the moving friction plates are in contact with or separated from the fixed friction plates continuously through straight reciprocating movement, so as to generate electric energy output to realize triboelectric nanogeneration; meanwhile, when the rotating disc is rotated, the magnets move relative to the coils, and induction electric current is generated through the magnetic induction line cutting movement of the coils, so that electromagnetic power generation is realized.

12. The combined wind turbine according to claim 11, further comprising a closed box body which covers the triboelectric nanogeneration module and the electromagnetic power generation module therein, wherein the box body comprises first side walls arranged in the axial direction of the transmission shaft and second side walls oppositely arranged on a circumferential side of the transmission shaft; the coils are arranged on the inner walls of the first side walls to form the stators; the nano-friction material layers are arranged on the inner walls of the second side walls to form the fixed friction plates.

13. The combined wind turbine according to claim 4, wherein a flexible buffer layer is further arranged between the nano-friction material layer and the fixed friction plate.

14. The combined wind turbine according to claim 13, wherein N poles and S poles of the magnets are arranged alternately, and the magnets and the coils are all arranged in fan shapes.

15. The combined wind turbine according to claim 13, wherein guide holes are formed in the fixed disc; the reset device comprises a reset guide rod and a reset spring arranged on the reset guide rod in a sleeving manner; the reset guide rod penetrates through the guide hole and is fixedly connected to the moving friction plate; the reset guide rods drive the moving friction plate to move in the axial direction of the guide hole under the action of the elastic force of the reset spring.

16. The combined wind turbine according to claim 15, wherein two groups of the fixed friction plates and the moving friction plates are oppositely arranged outside the radial direction of the rotating disc; two groups of the reset devices are correspondingly arranged on the fixed disc; the two groups of the reset devices are arranged alternately up and down; the reset devices, connected to the same moving friction plate, on different fixed discs are also arranged alternately up and down.

17. The combined wind turbine according to claim 4, wherein the driving devices are roller components; the roller component comprises a roller bracket and a rotating roller rotatably arranged on the roller bracket.

18. The combined wind turbine according to claim 17, wherein N poles and S poles of the magnets are arranged alternately, and the magnets and the coils are all arranged in fan shapes.

19. The combined wind turbine according to claim 17, wherein guide holes are formed in the fixed disc; the reset device comprises a reset guide rod and a reset spring arranged on the reset guide rod in a sleeving manner; the reset guide rod penetrates through the guide hole and is fixedly connected to the moving friction plate; the reset guide rods drive the moving friction plate to move in the axial direction of the guide hole under the action of the elastic force of the reset spring.

20. The combined wind turbine according to claim 19, wherein two groups of the fixed friction plates and the moving friction plates are oppositely arranged outside the radial direction of the rotating disc; two groups of the reset devices are correspondingly arranged on the fixed disc; the two groups of the reset devices are arranged alternately up and down; the reset devices, connected to the same moving friction plate, on different fixed discs are also arranged alternately up and down.

\* \* \* \* \*